S. H. SILL.
Gate.
No. 28,205.
Patented May 8, 1860.
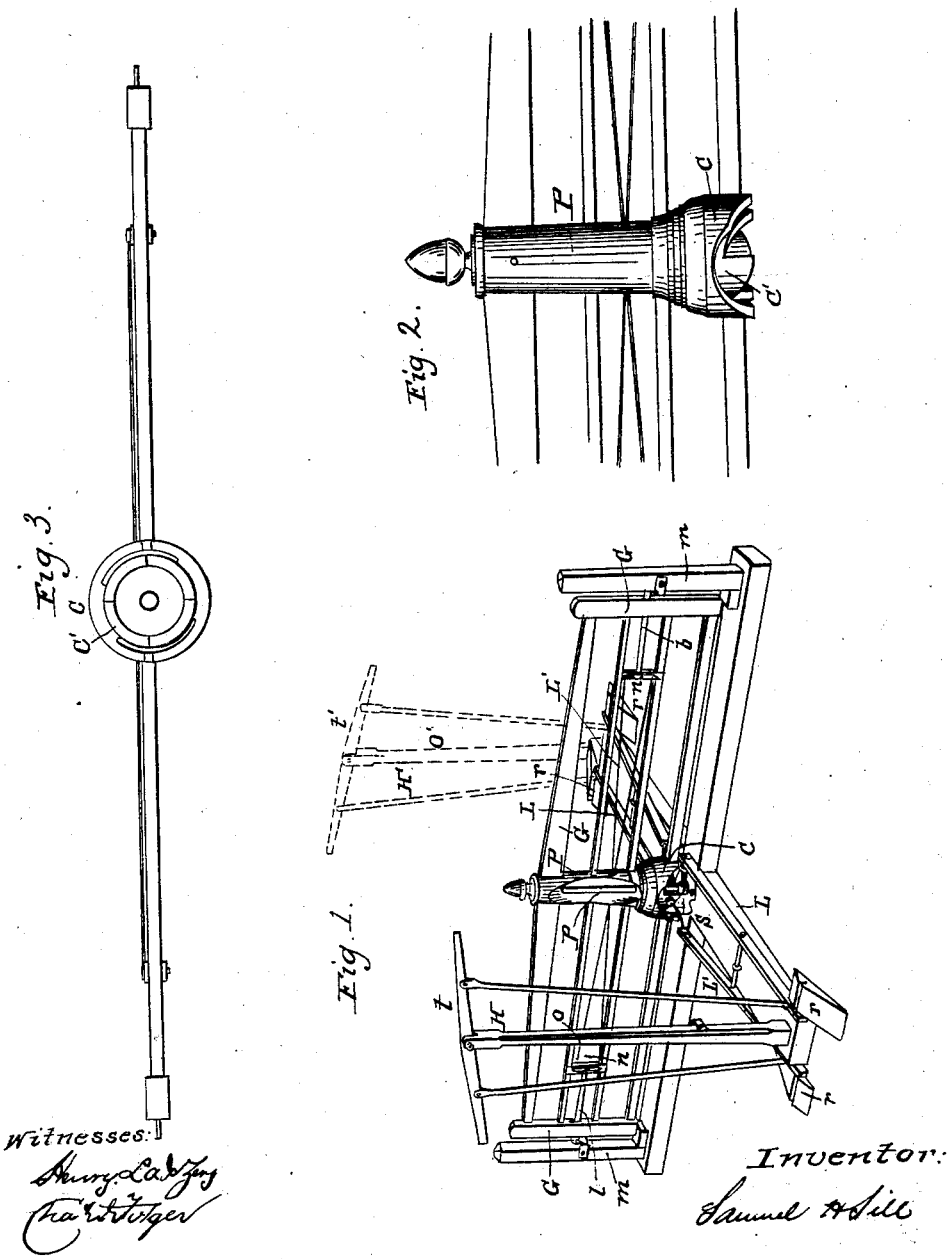

UNITED STATES PATENT OFFICE.

SAMUEL H. SILL, OF GENEVA, NEW YORK.

GATE.

Specification of Letters Patent No. 28,205, dated May 8, 1860.

*To all whom it may concern:*

Be it known that I, SAMUEL H. SILL, of Geneva, Ontario county, State of New York, have invented new and useful Improvements in Devices for Opening and Closing Gates; and the following is a full and clear description and representation thereof, reference being had to the drawings hereto annexed and making part hereof, in which—

Figure 1, is a perspective view of the gate and of the devices used for opening and closing it &c. Fig. 2, is a side view of the cams placed upon the gate post, and Fig. 3, is a view of the lower surfaces of said cams.

This gate is intended to be opened by the wheel of the carriage in driving through, or by a person passing through on horseback, or on foot.

My invention consists in so forming and arranging levers, cams and supports with the gate, that the lever shall raise the gate, disengage its fastenings and by the aid of a cam partially open or close it and then release it, allowing its weight to come upon standards, which with the aid of other cams will complete the opening or closing thereof, by the weight of the gate itself.

The gate to which I apply my improvements is a "double gate" or one which is supported and moves upon a post or other device at its center—and which revolves upon its center in the same direction both in opening and closing.

G, G, is the gate and P the post which supports it, and upon which it turns.

L, are the levers for opening the gate and L′, the levers for closing it in passing either in or out.

C, is the cam upon which the levers operate, and C′, those upon which the supports or standards *s* operate for opening, closing and arresting the gate. The levers on the right of the post are brought into operation in entering the inclosure, and those on the left in driving out. The gate rests upon a pintle (*p*) properly supported at the bottom, and extending upward, say eighteen inches or two feet, into the post.

*l*, and *l*, are the latches of the gate and *m*, *m*, the posts to which the catches are attached and *n*, *n*, are levers whose ends are connected by cords or rods crossing each other, so that when one latch is raised by hand, the other will be raised also.

H, H′, are arrangements for operating the levers L, L′, by a person on horseback for the purpose of opening the gate before him and closing it when he has passed through— The lever (*t*) is jointed to the top of a standard (*o*) and its ends are connected by rods with the ends of the levers L, L′, so that by operating the lever (*t*) with the hand, the levers L, L′, are also operated.

*r*, *r*, are treadles connected to the levers L, L′, upon which the carriage wheel runs to operate the levers.

The cam C, which operates in conjunction with the levers L, L′, extends entirely around the post and is formed as shown in the figures, especially Figs. 1 and 2. Commencing at the point where the friction roller on the end of the lever L, is seen to touch it, in Fig. 1, it rises gradually like the cams C′, for a short distance, and then is cut upward so that when the gate has revolved on its post, say 45 degrees, the remainder of the cam for say 90 degrees will not be reached by the roller on the lever— and after that the cam bends down to a point as low as where it started, and at the distance of a semicircle therefrom. The face of this cam on the other side of the post is precisely similar and extends to the place of beginning.

The form of the inner cam C′, is that of a common ratchet wheel, around the gate post, with four equal teeth in the edge of its rim— each of these teeth extends about 90 degrees—the form will be easily understood by inspecting the figures,—the points of two of these teeth are in the same diameter with the points of the cam C. Both cams are firmly attached to the gate post P. Directly under the rim of this cam C′, are two standards at a semicircle from each other, upon which two of the inclines of the cam C′, ordinarily rest, and, with the gate, are supported, and against which two of its shoulders operate as stops. These standards should have friction rollers at their upper ends—one of them is shown at *s* Fig. 1, but the other is concealed by the cam C.

Two of the levers L′, L′, are bent so that the points at which the four operate upon the cam C, shall be at 90 degrees from each other—there are also catches upon the posts *o*, *o*′, for the latches *l*, to hold the gate steady when open.

The operation of this gate is as follows: The carriage wheel runs upon the treadle *r*, on the right, bringing it flat upon the ground, or other surface, and of course depressing the end of the lever to which the treadle is attached, and raising the end under cam C. Two of the shoulders of the cam C', resting against the standards s, the gate cannot revolve by virtue of the incline on the cam C, till it has been sufficiently elevated by the lever to clear the shoulders of the cam C', but when the post and gate have been sufficiently elevated to clear these shoulders and lift the latches of the gate from their catches, the post resting by the incline of the cam C, on the friction roller of the lever, the weight of the gate will cause it to revolve by running down the incline partially opening the gate, till that portion of the cam C, which is cut away comes opposite the friction roller of the lever, when the weight of the gate, through the inclines of the cam C', will come upon the friction rollers of the standards, and the weight of the gate will cause it to continue its revolution, running down these inclines till the shoulders of this cam come against the standards and the latches fall into the catches in the posts o, o', when it will stop—the gate thus having revolved 90 degrees and become fully open and firmly held—and that part of cam C, which was over the friction roller of lever L, when the gate was shut, has come over the friction roller on lever L'. As the carriage passes through, the wheel is driven over the treadle beyond, by which the lever L', acts upon cam C, and the same operations which took place on entering, are repeated, and cause the gate to revolve 90 degrees in the same direction as before, which closes and fastens it.

In passing out, the carriage should be driven on the other side of the gate post, indeed in passing in, or out, the carriage should be driven to the right of the gate post, and as the forms of the cams as well as the levers are exactly symmetrical, the same operations will take place in opening and closing the gate and without stopping the carriage.

If a person desires to pass the gate on horseback, he has only to operate the lever (t,) which being connected with lever L, will produce the same effect as driving upon the treadle r, and the same at (t') in closing the gate.

If it be desired to enter on foot, it is better to go to the left of the post. When one of the latches (l) is raised, by virtue of the levers (n, n) attached firmly thereto and the cross rods or cords connecting them, the lifting of one out of its catch, will also lift and release the other—and then by pushing the gate in the opposite direction to that in which it moves when opened by a carriage, the gate will revolve, rising up the inclines on the cam C', and when the party has passed will close after, running back down the same inclines, by its weight.

It is perfectly obvious that the cam C', might be turned the other side up, and fixed firmly under the post, and the standards transferred to the lower end of the post, and the gate would operate in the same manner and upon the same principle—but I prefer the form which I have shown, because the inclines, if reversed, would be encumbered often with snow and ice and thus rendered inefficient.

Having thus fully described my improvement, what I claim as my invention and desire to secure by Letters Patent, is,

1. The combination of the levers L, and L' with the cam C, formed, and arranged with reference to the gate substantially as described, whereby the gate is elevated, disengaged from the cam stop and fastenings, partially revolved, and disengaged from the lever substantially as set forth.

2. The arrangement with the above of the cam C, and the standards s, substantially in the manner and for the purpose set forth.

SAMUEL H. SILL.

In presence of—
HENRY L. DE ZENG,
CHAS. I. FOLGER.